United States Patent [19]

Yeh

[11] 4,204,093
[45] May 20, 1980

[54] VARIABLE FRAME RATE TECHNIQUE FOR USE IN A TIME-DIVISION MULTIPLE ACCESS (TDMA) COMMUNICATION SYSTEM

[75] Inventor: Yu Shuan Yeh, Freehold Township, Monmouth County, N.J.

[73] Assignee: Bell Telephone Laboratories, Incorporated, Murray Hill, N.J.

[21] Appl. No.: 907,795

[22] Filed: May 19, 1978

[51] Int. Cl.² .............................................. H04J 3/16
[52] U.S. Cl. ...................................... 370/95; 370/97; 370/104; 375/3; 375/108
[58] Field of Search ........ 179/15 BS, 15 BW, 15 AS, 179/15 BA, 15 BV; 325/4

[56] References Cited

U.S. PATENT DOCUMENTS

| | | | |
|---|---|---|---|
| 3,789,142 | 1/1974 | Shimasaki | 179/15 BS |
| 3,848,093 | 11/1974 | Edstrom | 179/15 AS |

Primary Examiner—David L. Stewart
Attorney, Agent, or Firm—Erwin W. Pfeifle

[57] ABSTRACT

The present invention relates to a method for use in a communcation system of providing efficient access by low traffic stations while keeping the buffering requirements for high traffic stations at a minimum. The method provides a TDMA architecture which includes a plurality of different frame rates which is dependent on the traffic requirements between station pairs. In operation, a sequence of a plurality of s switching frames are used to form a super frame and each communication burst of a switching frame is divided into a plurality of q subbursts representative of q transmission channels so that a maximum of (q·s) transmission channels are available for assignment in corresponding bursts during a super frame. When traffic demands require n·s channels between two ground stations, then n subbursts in corresponding bursts in each switching frame will be assigned thereto for an integer portion of n, while demands for less than s channels will be spread as evenly as possible throughout the corresponding bursts of the s switching frames of a super frame.

13 Claims, 4 Drawing Figures

TO DOWN LINK FIXED BEAMS 13a-13k (A-K) AND SCANNING SPOT BEAM 15 (S)

UP LINKS SPOT 12a

SPOT 12b

SPOT 12k

SCANNING BEAM 14

VARIABLE FRAME RATE TECHNIQUE FOR USE IN A TIME-DIVISION MULTIPLE ACCESS (TDMA) COMMUNICATION SYSTEM

BACKGROUND OF THE INVENTION

1. Field of the Invention

The present invention relates to a technique for providing a plurality of different frame rates for use in time-division multiple access (TDMA) communication system and, more particularly, to a technique which uses the well-known time-division multiple access mode while still providing a plurality of different frame rates which is dependent on the traffic demands between the various pairs of remote, spaced-apart, ground stations making up the communication system to provide efficient access therebetween.

2. Description of the Prior Art

In a time-division multiple access (TDMA) communication system, a transmitting station or area normally communicates with a plurality of remote, spaced-apart, receiving stations or areas by sequentially accessing each of the receiving stations or areas before repeating the sequence. The period of transmission to each receiving station or area is generally known as a transmission burst and in general the sequence of transmission bursts is synchronized in a TDMA frame period and each of the transmitting station and receiving stations are synchronized to enable reception of the associated transmission bursts. In this regard see, for example, U.S. Pat. No. 3,772,475 issued to A. Loffreda on Nov. 13, 1973 and in particular FIG. 1 and the associated description therein.

It is generally found that the traffic demands between a transmitting station or area and each of the receiving stations or areas is not equal and to compensate for such diverse traffic demands prior art TDMA systems have used longer or shorter transmission bursts in a direct relationship to such traffic demands. In this regard see, for example, U.S. Pat. Nos. 3,711,855 issued to W. G. Schmidt et al on Jan. 16, 1973, and especially FIGS. 4A and 4B thereof where two bursts are used for high traffic stations; 3,778,715 issued to W. G. Schmidt et al on Dec. 11, 1973 and especially FIG. 3A thereof; 3,789,142 issued to N. Shimasaki et al on Jan. 29, 1974, especially FIGS. 8A–8C; and Re. 28,577 issued to W. G. Schmidt on Oct. 21, 1975, especially FIGS. 1 and 2.

The TDMA format is primarily used in multiple beam satellite communication systems and in such systems it is desirable from a weight and reliability consideration to have a single transponder associated with each beam which is operating at the maximum channel bit rate. For example, at 12/14 GHz the transponder bandwidth may be 500 MHz and can comfortably support 4 $\phi$ PSK modulation at 600 Mbs/sec (300 Mbauds/sec). For a channel transmission at such a high rate which is to be accessed by perhaps hundreds of stations in that beam, it is imperative to have an efficient access scheme. Time-division-multiple access provides such a solution if the number of accesses is small. When the number of accesses is large, the overhead associated with each transmission burst starts to cut into the system efficiency and longer frames must be used. Associated with the use of longer frames is the problem that buffer (high speed) requirements correspondingly increase. Thus, in the prior systems, the problem exists that for system efficiency, longer frames should be used, yet for buffer size considerations, shorter frames should be used.

BRIEF SUMMARY OF THE INVENTION

The foregoing problem has been solved in accordance with the present invention which relates to a technique for providing a plurality of different frame rates for the individual receiving stations or areas in a TDMA communication system which is dependent on the traffic demands between the various pairs of remote, spaced-apart, stations or areas making up the communication system.

It is an aspect of the present invention to provide a TDMA architecture which includes a plurality of different frame rates which is dependent on the traffic requirements of each station. In operation, a standard TDMA communication switching frame burst format is concurrently used for the transmissions of each of a plurality of x remote spaced-apart ground locations which permits each ground location to sequentially communicate with every other ground location while assuming that no two ground locations are concurrently accessing the same location. A sequence of a plurality of s switching frames are used to form a super frame and each communication burst of a switching frame is divided into a plurality of q subbursts representative of q transmission channels so that a maximum of (q·s) transmission channels are available for assignment in the corresponding bursts of all the switching frames of the super frame. When traffic demands require n·s channels between two ground stations, then n subbursts in corresponding bursts in each switching frame will be assigned thereto for an integer portion of n, while demands for less than s channels will be spread as evenly as possible throughout the corresponding bursts of the s switching frames of a super frame.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

Figure 1:
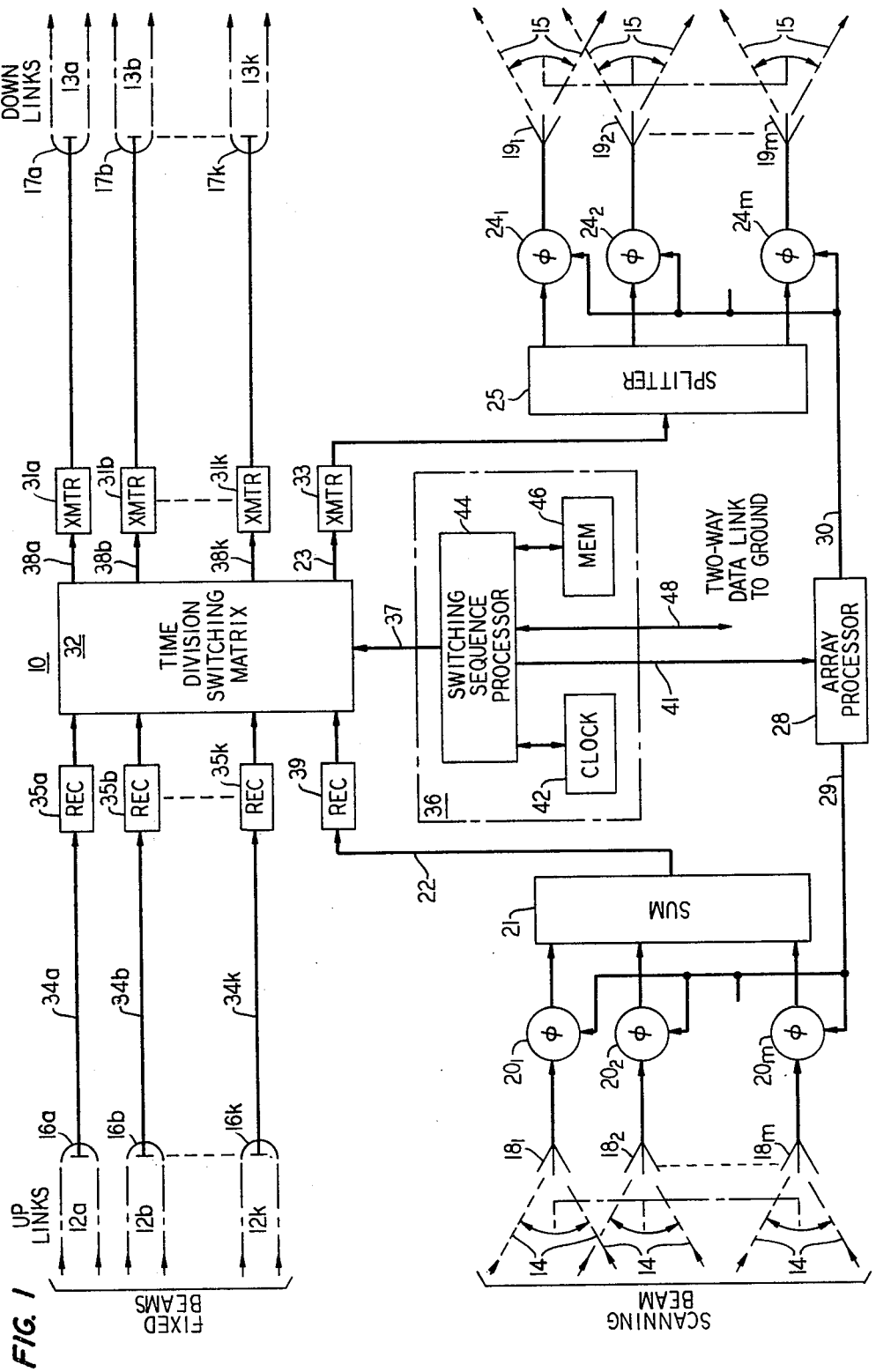
FIG. 1 is a block diagram of a satellite repeater time-division interconnection arrangement for interconnecting a plurality of fixed up-link and down-link spot beams and an up-link and down-link scanning spot beam.

The present invention is described hereinafter primarily in reference to a multibeam satellite communication system. However, it will be understood that such description is exemplary only and is for purposes of exposition and not for purposes of limitation. It will be readily appreciated that the inventive concept described is equally applicable to a single beam TDMA communication system wherein one transmitting station or area desires communication with a plurality of remote, spaced-apart, receiving stations or areas where traffic demands between the transmitting station or area and each receiving station or area may be different from that of the other stations or areas.

A scanning beam satellite communication system can provide complete coverage of a selected area, as, for example, the entire United States, on a time-division multiple access (TDMA) basis. In such a system, the scanning beam's instantaneous antenna pattern is concentrated to a small area of the entire area to be covered. This results in, inter alia, a realization of savings in RF power to permit the simultaneous use of a scanning beam and a number of fixed spot beams. In this manner the scanning beam can be used to serve many spaced-apart low traffic ground station areas while each of the fixed spot beams can be used to serve a separate high traffic ground station area such as a metropolitan area located within the entire area to be served by the satellite system. In this manner, a satellite system is provided having increased capacity over the presently used area beam or spot beam system or the proposed scanning beam systems. Additionally, such communication systems permit the fixed and scanning spot beams, under normal operating conditions, to transmit signals within the same frequency spectrum with virtually no interference therebetween since the beams do not overlap each other at the associated ground station areas as found in the proposed combined area coverage and fixed spot beam systems which require interference rejection techniques to be used when employing the same frequency spectrum for all signals. However, to assure substantially no interference, it is preferred that the scanning spot beams and the fixed spot beams utilize different polarizations. Additionally, the use of different polarizations is preferable since occasions can occur when the scanning beam may be required to be directed either wholly or partially into a fixed beam ground station area to overcome, for example, an overload condition existing in a particular fixed beam ground station area or a malfunction at the satellite of a particular fixed beam transmitter or receiver. Since such communication system provides many variations of problems encountered in systems using the TDMA concept for one or multiple beams of the same kind, the present invention will be described for use with a multiple fixed and scanning spot beam system for exemplary purposes only after such system has been described to provide the proper background for understanding the present invention.

Turning now to the drawings, FIG. 1 illustrates a basic satellite switching repeater 10 configuration for concurrently transmitting and receiving a plurality of fixed spot beams and one scanning spot beam. For illustrative purposes only, 11 up-link and 11 down-link fixed spot beams designated $12a$–$12k$ and $13a$–$13k$, respectively, and a scanning up-link and down-link spot beam designated 14 and 15, respectively, are shown. Each of the associated up-link and down-link fixed spot beams $12a$, $13a$; $12b$, $12b$; ... ; $12k$, $13k$ are received from and transmitted to a separate fixed geographical ground area (not shown) within the viewing area of satellite switching repeater 10. The up-link and down-link scanning spot beams 14 and 15 are scanned independently among a plurality of spaced-apart geographical ground areas (not shown) which do not form a part of the geographical ground areas associated with the various fixed spot beams 12 and 13. For illustrative purposes only, the plurality of corresponding spaced-apart geographical ground areas associated with scanning spot beams 14 and 15 will be considered to include one hundred separate areas. It is also to be understood that each of the 11 fixed spot beam and 100 scanning spot beam geographical ground areas can include one or more ground stations desiring to communicate with any of the other ground stations in the same or other geographical ground areas.

Each of the up-link fixed spot beams $12a$–$12k$ are shown being intercepted or received at antennas $16a$–$16k$, respectively, while each of the down-link fixed spot beams $13a$–$13k$, are launched by antennas $17a$–$17k$, respectively. It is to be understood that antennas $16a$–$16k$ and $17a$–$17k$ can comprise any suitable antenna means capable of receiving or transmitting each of fixed spot beams $12a$–$12k$ and $13a$–$13k$ as, for example, a single reflector having the requisite aperture to cover all of the associated fixed spot beam geographical ground areas and a separate feedhorn for each fixed spot beam disposed on the focal plane of the reflector at a point where the associated fixed spot beam is focused by the reflector.

The up-link and down-link scanning spot beams 14 and 15 are respectively received and transmitted by any suitable antenna means which will permit the individual beams to be scanned over all of the 100 exemplary scanning spot beam geographical ground areas. Such antenna means can take the form of, for example, a phased antenna array as shown in FIG. 1 where the up-link receiving array and down-link transmitting array are each shown as comprising a plurality of m elements $18_1$–$18_m$ and $19_1$–$19_m$, respectively. The receiving antenna elements $18_1$–$18_m$ are connected to phase shifters $20_1$–$20_m$, respectively, which, in turn, are connected to a summing circuit 21 for combining the output signals from phase shifter circuits $20_1$–$20_m$ into a single combined output signal on lead 22. Similarly, the input terminal of the down-link transmitting antenna elements $19_1$–$19_m$ are connected to the output terminals of phase shifters $24_1$–$24_m$, respectively, with the input terminal of phase shifters $24_1$–$24_m$ being connected to the output terminals of a splitting circuit 25. Splitting circuit 25 receives the instantaneous signal to be transmitted via scanning spot beam 15 on lead 26 and divides the signal equally for distribution to phase shifters $24_1$–$24_m$ which alters the phase of the associated input signal in a manner to cause elements $19_1$–$19_m$ to transmit scanning spot beam 15 in the desired direction as is well known in the art. It is to be understood that the corresponding elements of the receiving and transmitting array such as elements $18_1$, $19_1$; $18_2$, $19_2$; ... ; $18_m$, $19_m$ can comprise the same element but that under such condition separate paths for the transmitting and receiving signals between each element and its associated transmitting and receiving phase shifter may be required and can be achieved by any suitable technique as, for example, the use of known circulators in conjunction with a frequency difference between signals. Additionally, each of phase shifters $20_1$–$20_m$ and $24_1$–$24_m$, summing circuit 21, and splitting circuit 25 can comprise may suitable circuit which is commercially available.

Figure 3:
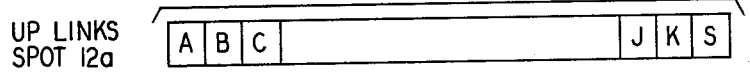
FIG. 3 illustrates an exemplary switching frame sequence format for concurrently interconnecting 11 up-link fixed spot beams and one up-link scanning spot beam with 11 down-link fixed spot beams and one down-link scanning spot beam.
Figure 3:
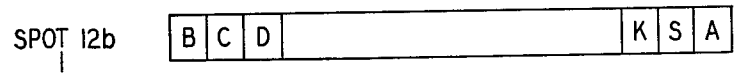
Figure 3:
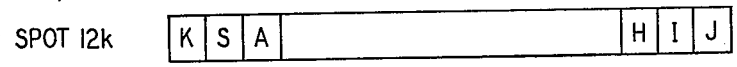
Figure 3:
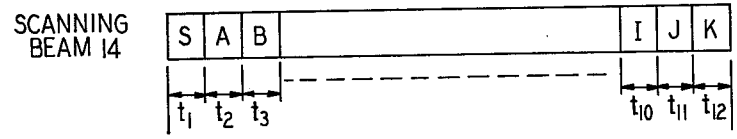

In the operation of each of scanning spot beams 14 and 15, an array processor 28 transmits a sequence of control signals over a bus 29 to each of the up-link phase shifters $20_1$–$20_m$ using any suitable technique well known in the art such as, for example, a memory for sequentially storing the sequence of control signals similar to that shown in FIG. 3b of U.S. Pat. No. 3,978,482 issued to F. C. Williams on Aug. 31, 1976 to cause the array to scan spot beam 14 over the associated scanning spot beam geographical ground areas in synchronization with the expected reception of signals from such ground areas. Concurrent therewith, the array processor 28 similarly transmits a separate sequence of control signals over a bus 30 to each of the down-link phase shifters $24_1-24_m$ to cause the array to scan spot beam 15 over the associated scanning spot beam geographical ground areas in synchronization with the expected transmission of signals to such areas as will be more clearly defined in conjunction with the discussion hereinafter relating to FIG. 3.

The up-link signals concurrently received via fixed spot beams 12a–12k and scanning spot beam 14 form separate input signals on leads 34a–34k and 22, respectively, to respective receivers 35a–35k and 39 and, in turn, to a time-division switching matrix 32. These input signals are concurrently and selectively switched by the space and time-division switching matrix 32, in response to control signals on bus 37 from a clock and switching sequencer 36, to the appropriate output lead 38a–38k and 23 for transmission via transmitters 31a–31k and 33 and, in turn, down-link fixed spot beams 13a–13k and scanning spot beam 15, respectively.

Figure 2:
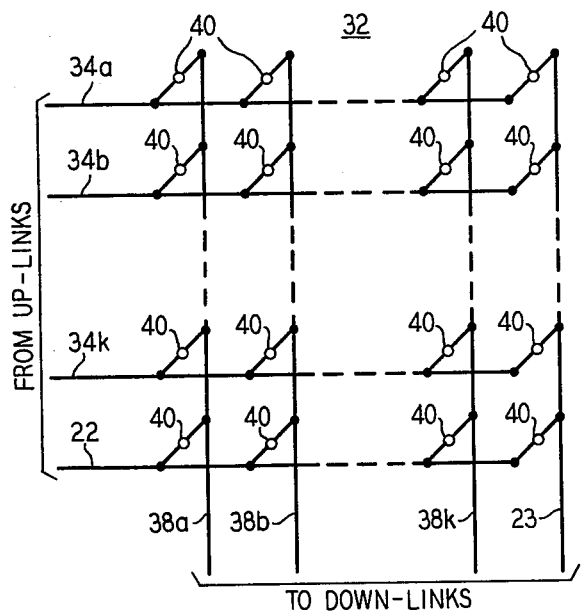
FIG. 2 is a schematic diagram of a typical satellite time-division switching matrix for use in the present satellite repeater of FIG. 1.

Time-division switching matrix 32 can comprise any suitable switching matrix which can provide high-speed switching with relatively low power requirements. Exemplary switches which have the desired characteristics are, for example, the well known microwave switches which include, inter alia, the semiconductor diode (pin) switch and the magnetic latching switch. An arrangement for switching matrix 32 is shown in FIG. 2 and is typical of known arrangements. For the exemplary conditions of 11 fixed up-link and down-link spot beams serving 11 spaced-apart high traffic geographical ground areas and one up-link and down-link scanning spot beam serving 100 spaced-apart low traffic geographical ground areas, the switching matrix 32 comprises a 12×12 array of microwave switches 40 and their associated drivers (not shown). Each of the instantaneous up-link signals on input leads 34a–34k and 22 are concurrently cross connected via a separate one of switches 40 to the desired one of output leads 38a–38k and 23 in response to control signals on bus 37 from clock and switching sequencer 36. The dynamic switching of the satellite switching matrix 32 is divided into a sequence of time intervals which are combined into a frame interval as shown in FIG. 3.

Clock and switching sequencer 36 comprises a clock circuit 42, a switching sequencer processor 44 and a memory section 46. The clock circuit 42 is synchronized with all the system clocks at the remote ground areas via telemetry signals on a two-way data link 48 from one or more ground stations to permit effective reception and transmission of signals through satellite repeater 10 via switching matrix 32. The clock pulses from circuit 36 are also transmitted over lead 41 for use by array processor 28 for coordinating the control signals transmitted over buses 29 and 30 to phase shifters $20_1-20_m$ and $24_1-24_m$, respectively, to direct scanning spot beams 14 and 15 at the appropriate ground area in synchronization with (a) the expected arrival and transmission of signals related to each ground area and (b) the simultaneous switching of the received signals to the appropriate down-link beams by switching matrix 32. Synchronization of the system clocks can be achieved using any suitable technique known in the art which, for example, can take the form of synchronization pulses which are transmitted via round trip telemetry signals through the satellite repeater 10 to the various ground stations. The switching sequencer processor 44 of circuit 36 generates the necessary control signals to interconnect the appropriate input and output leads through switches 40 of matrix 32 during each frame interval in response to the synchronized clock signals from clock 42 and the desired interconnection sequence stored in the associated memory section 46. Any suitable high speed switching sequencer and memory means which is available can be used to generate the desired control signals.

In accordance with the present invention, it is to be understood that many ground stations may be disposed within each of the receiving areas of down-link fixed spot beams 13a–13k, and scanning spot beam 15 and that these ground stations will have diverse circuit requirements ranging from a few circuits for a small station to hundreds of circuits for a major station. An additional difficulty is that although the ground stations serviced by each of fixed spot beams 13a–13k are covered by that particular beam all of the time, the ground stations serviced by scanning spot beams 14 and 15 can only be intermittently covered. Therefore, each scanning spot beam is individually steered so that various spaced-apart geographical ground areas within the scanning range of the phased array antenna $18_1-18_m$ and $19_1-19_m$ can be covered and a TDMA configuration is perfectly suited therefor. To achieve total service, it becomes necessary to scan both the transmit and receive scanning spot beams 14 and 15, respectively, while coordinating their movements with array processor 28 in accordance with the pair-wise traffic demands of the system.

Figure 4:
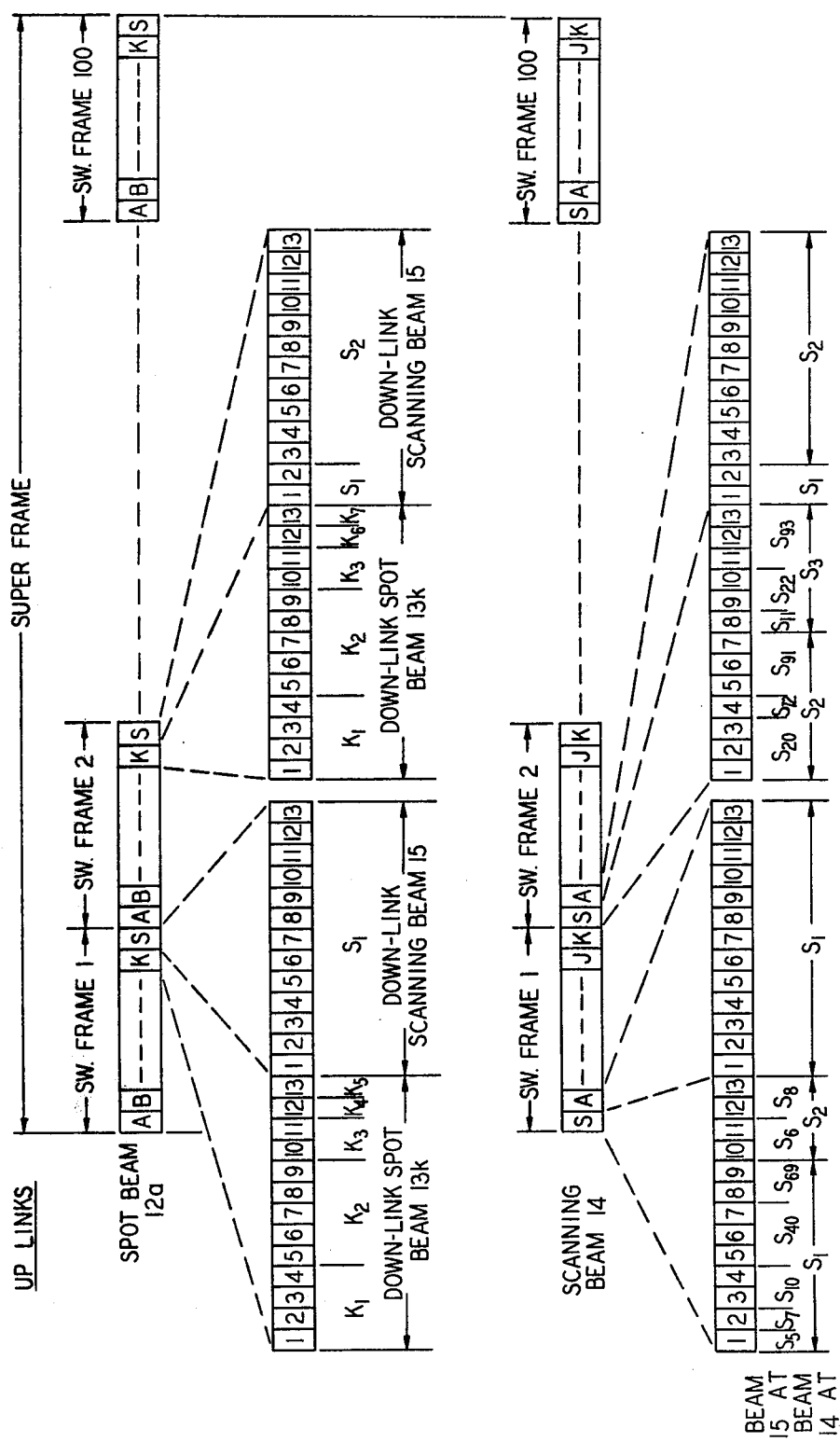
FIG. 4 illustrates exemplary burst assignments for transmission of signals between the various ground areas and stations therein for the format of FIG. 3 in accordance with the present invention.

An architecture, in accordance with the present invention, which allows efficient multiple access by the low traffic demand group stations while still providing minimal buffer demands for the high traffic demand ground stations is shown in FIGS. 3 and 4. For purposes of illustration, it will be assumed that there is equal traffic among beams. Under such condition the satellite time-division switching matrix 32 follows a cyclic pattern and establishes connections among the various beams on a subframe basis per each switching frame, where in FIG. 3, for exemplary purposes, the frame is designated T and each of the sequential subframes therein has a separate designation in the sequence $t_1-t_n$, where n represents the total number of down-link beams and equals 12 for the exemplary system having 11 fixed-up link and down-link spot beams and one up-link and down-link scanning spot beam. In FIG. 3, up-link fixed spot beam 12a is shown sequentially connected by switching matrix 32 to down-link beams A(13a), B(13b), . . . , K(13k), and S(15) once during each switching frame period T. Concurrent therewith, up-link fixed spot beam 12b is sequentially connected by switching matrix 32 to down-link beam B(13b), C(13c), . . . , S(15), and A(13a) while up-link scanning spot beam 14 is sequentially connected to down-link beams S(15), A(13a), . . . , J(13j) and K(13k) during switching frame period T. Similarly all other up-link fixed spot beams 12k–13k are concurrently connected to the various down-link fixed spot beams 13a–13k and scanning spot beam 15 in a sequence which assures that no two up-link beams are connected at any instant of time to the same down-link beam. It is to be understood that the sequences shown in FIG. 3 for the switching of signals between up-link beams 12a–12k and 14 and down-link beams 13a–13k and 15 are merely illustrative of a typical set of sequences and that any other set of sequences which do not at any instant of time connect two up-link beam signals to the same down-link beam can be substituted.

To implement a TDMA switching arrangement for the exemplary combination of a plurality of up-link and down-link fixed spot beams and an up-link and a down-link scanning spot beam presents various problems which must be overcome for an operable system. For example, a minimum burst length for communication between any two ground stations must be chosen to achieve efficient access and then a subframe and a frame length determined to meet the various traffic demands where each fixed and scanning spot beam ground area can comprise one or more separate ground stations desiring access to satellite repeater 10.

For purposes of illustration and not for purposes of limitation, the arrangement of FIG. 1 will hereinafter be assumed to operate with voice circuits at a 32 kb/sec. rate, a minimum burst length of 400 bauds with, for example, a preamble of 67 bauds, and a frame T duration of 250 μsec. With such conditions prescribed, a minimum burst length of 467 bauds would have a duration of 1.557 μsec. at a bit rate of 600 mb/sec., and provide transmission for 100 voice circuits at the 32 kb/sec. rate. The preamble for each burst generally provides the necessary information for, inter alia, carrier and timing recovery, frame synchronization, ground station identification, etc. In view of the format of FIG. 3 and the above-mentioned assumptions, each of the 12 subframes $t_1$–$t_{12}$ of frame T has a capacity of 6250 bauds of information which can include slightly more than 13 minimum bursts of 467 bauds. This remainder above the 13 minimum bursts per subframe is used, for example, with the scanning beams 14 and 15 as overhead which is a function of the beam switching speed.

Therefore, during each subframe, t, of the format of FIG. 3, each of the exemplary 11 up-link fixed spot beams 12a–12k and the up-link scanning spot beam 14 can access no more than 13 ground stations within a fixed spot beam receiving ground area or 13 scanning spot beam ground stations. Since it was assumed that, in the exemplary system, scanning spot beams 14 and 15 were to be associated with 100 spaced-apart low traffic ground areas each having one or more ground stations associated therewith, the format of FIG. 3 must be expanded upon to permit each of the ground stations associated with up-link fixed and scanning spot beams 12a–12k and 14 to communicate with all of the other ground stations via down-link fixed and scanning spot beams 13a–13k and 15. Although preferably it is desirable to space the required minimum burst evenly throughout the super frame sequence to keep buffering requirements at a minimum where the voice circuit (V.C.) requirement is less than the number of associated subframes, e.g., 100 in the exemplary format, such required minimum bursts, or subbursts can be arbitrarily spread randomly througout the associated subframes where so desired. For example, for a 7 V.C. requirement, 7 minimum bursts can be used in one subframe or spread throughout 7 or less subframes. To accomplish this, the switching and burst assignment format of FIG. 4 is used which applies a sequence of 100 frames, T, designated 1–100 to make up a super frame.

In the structure of FIG. 4, the sequence shown in FIG. 3 for each frame is repeated for each of the up-link fixed spot beams 12a–12k and up-link scanning spot beam 14 in each of the associated 100 frames 1–100. The different traffic demands between the various pairs of ground stations of the system is substantially met in accordance with the present invention by the proper scheduling of an appropriate number of minimum bursts within a subframe designated for communication between the ground areas wherein the two stations are situated. For purposes of illustration only, an exemplary sequence will be shown for the allocation of signalling time between ground stations using fixed up-link spot beams 12a and, for example, the ground stations in both fixed spot beam area K, served by fixed down-link spot beams 13k, and scanning spot beams areas $S_1$–$S_{100}$, served by scanning down-link spot beam 15. It is to be understood that many other sequences can be used to fulfill the traffic demands of the various pairs of ground stations and still fall within the spirit and scope of the present invention and that such sequences can be applied to TDMA systems using only one beam for communication purposes.

For purposes of illustration, it will be assumed that the ground area served by up-link and down-link fixed spot beams 12a and 13a, respectively, has four ground stations ($A_1$–$A_4$) and that the ground area served by up-link and down-link fixed spot beams 12k and 13k, respectively, has seven ground stations ($K_1$–$K_7$). It will be further assumed that the traffic demands for communication from ground stations $A_1$–$A_4$ to each of the ground stations $K_1$–$K_7$ require the following number of voice circuits: $K_1$=400 voice circuits (V.C.); $K_2$=500 V.C.; $K_3$=200 V.C.; and $K_4$–$K_7$ each require 50 V.C. It is to be understood that with the system conditions previously assumed, only a maximum of 1300 voice circuits are available between any two fixed beam ground areas since there are only 1300 minimum bursts available in a super frame between such ground stations. More particularly, to provide 100 voice circuits between two particular ground areas it is necessary to assign 100 minimum bursts per super frame for such communication. This can be preferably accomplished by assigning one corresponding burst in each frame of the super frame or alternatively, for example, to assigning two minimum bursts in alternate frames of the super frame to such intercommunication link.

In FIG. 4, each of the subframes K in switching frames 1 and 2 which interconnect the signals in up-link fixed spot beam 12a to down-link fixed spot beam 13k have been expanded to show the 13 possible sequential minimum bursts therein and how such bursts can typically be assigned to meet the traffic demands specified hereinabove. For example, the 400, 500 and 200 V.C. requirements for communication with ground stations $K_1$, $K_2$ and $K_3$, respectively, have been met by assigning these ground stations respectively to minimum bursts 1–4, 5–9 and 10–11 in each of switch frames 1–100. Since each of ground stations $K_4$–$K_7$ only require 50 V.C., these traffic demands are met by, for example, assigning minimum bursts 12 and 13 of the odd numbered frames to ground stations $K_4$ and $K_5$, respectively, and the bursts 12 and 13 of the even numbered frames to ground stations $K_6$ and $K_7$, respectively. Therefore, any ground station having less than a 100 V.C. requirement uses buffering means to store its signal until the assigned burst, at which time the stored signals will be transmitted. For example, a ground station having a 25 V.C. requirement might transmit its signals during a single minimum burst once every 4th frame or a 10 V.C. requirement might use a single minimum burst once every 10th frame. It is to be understood that a minimum burst of 467 bauds may contain less than 400 bauds of information where desired, but that such transmission would reduce the transmission efficiency.

At the transmitting end in the area associated with up-link fixed spot beam 12a, ground stations $A_1$–$A_4$ will be similarly scheduled to each appropriately interleave their respective transmissions destined for ground stations $K_1$–$K_7$ in accordance with both their individual traffic demands and the subframe sequence hereinbefore outlined in FIG. 4. For example, if the traffic demands between each of ground stations $A_1$–$A_4$ and ground station $K_1$ is 100 V.C., then during each of frames 1–100 minimum bursts 1–4 can be assigned to ground stations $A_1$–$A_4$, respectively. Where the traffic demands between ground stations $A_1$–$A_4$ and ground station $K_1$ are, for example, $A_1$=200 V.C., $A_2$=100 V.C., and $A_3$ and $A_4$ each require 50 V.C. Then minimum bursts 1 and 2 can be assigned to ground station $A_1$ in each frame, burst 3 to ground station $A_2$ in each frame and burst 4 alternately shared by ground station $A_3$ and $A_4$ where station $A_3$ might be assigned burst 4 in the odd numbered frames while station $A_4$ is assigned burst 4 in the even numbered frames. A similar technique is used with each of the other ground station areas and the other fixed up-link spot beams 12b–12k.

With reference to the interconnection of up-link signals in fixed spot beam 12a to down-link scanning spot beam 15 during subframe S of each frame in the super frame, a similar technique is used as outlined hereinbefore for the communication of ground stations $A_1$–$A_4$ with ground stations $K_1$–$K_7$. Since there are 100 exemplary scanning beam ground areas each of which has one or more ground stations therein, it becomes impossible to access them all during one frame when only 13 minimum bursts are available during an associated subframe. Therefore, since the scanning beam ground station areas and the associated ground stations therein are of a low traffic type, assignment of the minimum bursts over the 100 subframes in a super frame is again accomplished in accordance with the individual traffic demands existing between the various high and low traffic ground station areas. For example, if the traffic demands between ground stations $A_1$–$A_4$ and scanning beam ground areas $S_1$ and $S_2$ are 15 and 11 voice circuits, respectively, then such traffic demands can be met by respectively assigning bursts 1–13 of subframe S in switch frame 1 and bursts 1–2 of subframe S in switch frame 2 to ground area $S_1$ and bursts 3–13 of subframe S in switch frame 2 to ground area $S_2$ as shown in FIG. 4. By combining adjacent bursts within a single subframe or corresponding adjacent subframes to such traffic demands instead of spreading them via single bursts over more frames results in a reduction in the amount of movement of scanning beam 15. Therefore, during each subframe S for fixed spot beams 12a–12k and scanning spot beam 14 the down-link scanning beam is moved over from one to 13 scanning beam ground areas in accordance with a schedule determined from the various traffic requirements. It is to be understood that such schedule for all beams is repeated every super frame.

While the down-link scanning spot beam 15 is moving between a maximum of 156 scanning beam ground areas (12 subframes × 13 minimum bursts) during each frame for all of the up-link beams, up-link scanning beam 14 is preferably moved in the following manner and as shown in FIG. 4. With reference to the period of each frame devoted to the transmission of signals via each of down-link fixed spot beam 12a–12k which originated at one or more scanning beam ground areas, up-link scanning beam 14 is directed at the particular one or more of the 100 scanning beam ground areas during each frame of the super frame in a manner preferably to complete the two-way transmissions found in the up-link sequence between each of the fixed spot beams 12a–12k and each of the scanning beam ground areas. More particularly, during each portion of frames 1–100 of the super frame assigned for down-link transmissions via fixed spot beams 13a–13k, scanning beam 14 is sequentially directed at particular ones of the scanning beam ground areas 1–100 in accordance with the sequence with reciprocally corresponds to the sequence used for subframe S in each frame associated with up-link fixed spot beams 12a–12k. For example, as shown in FIG. 4, during subframe A of switching frame 1, scanning spot beam 14 is directed at scanning beam ground area $S_1$ during bursts 1–13 for the transmission of 13 voice circuits from ground area $S_1$ to fixed spot beam area A served by down-link fixed spot beam 13a, since during subframe S of switching frame 1, 13 voice circuits were received from ground area A via up-link fixed spot beam 12a and destined for scanning beams ground area $S_1$ via down-link scanning spot beam 15. Similarly, during subframe A of switching frame 2, scanning spot beam 14 is directed at scanning beam ground area $S_1$ during bursts 1–2 and then at scanning beam ground area $S_2$ during bursts 3–13 to provide the return voice paths for the 13 voice circuits shown in subframe S of switching frame 2 associated with up-link fixed spot beam 12a.

During subframe S of each of frames 1–100, however, scanning beam 14 is moved in the following manner to both achieve maximum coverage of the scanning beam ground areas $S_1$–$S_{100}$ and substantially meet the traffic requirements between the various pairs of the ground areas $S_1$–$S_{100}$. In accordance with the previously assumed system conditions, only 1300 voice circuits (V.C.) are available per super frame for use for communication between all the pairs of scanning beam ground stations $S_1$–$S_{100}$. For purposes of illustration, it will be assumed that the traffic demands between (a) scanning beam ground area $S_1$, and scanning beam ground areas $S_5$, $S_7$, $S_{10}$, $S_{40}$ and $S_{69}$ are 1, 1, 2, 3, and 2 V.C., respectively; (b) scanning beam ground area $S_2$ and scanning beam ground areas $S_6$, $S_8$, $S_{20}$, $S_{72}$ and $S_{91}$ are 2, 2, 3, 1, 3 V.C., respectively, and (c) scanning beam ground area $S_3$ and scanning beam ground areas $S_{11}$, $S_{22}$ and $S_{93}$ are 1, 2 and 3 V.C., respectively. The above-mentioned traffic demands can be met by typically scheduling the minimum bursts 1–13 in subframe S of switch frame 1 and 2 associated with scanning beam 14 as shown in FIG. 4. The other subframes S of switch frames 3–100 can be similarly assigned to cover the other traffic demands between any two scanning beam ground areas to the extent of 1300 voice circuits. By assigning voice circuit requirements to adjacent minimum bursts rather than to individual bursts spread over a number of frames, minimum movement of both scanning beams 14 and 15 is achieved.

If a switching frame length of 250 μsec is assumed in the format of FIG. 4, it can be seen that, in accordance with the present invention, where a traffic demand of 100 voice circuits (V.C.) exists between a transmitting and a receiving station or area, as specified between stations $A_2$ and $K_1$, a frame rate of 250 μsec is provided and station $A_2$ need only provide a buffering means for storing 467 bauds or one voice circuit. Similarly, in accordance with the present invention, where a traffic demand of 50 V.C. exists between a transmitting and a receiving station area, as specified between area A and each of stations $K_4$-$K_7$, an effective frame rate of 500 μsec is provided and the transmitting stations in area A also need only provide a buffering means for storing 467 bauds or one voice circuit for each of such transmissions. It follows that, in accordance with the present invention, traffic demands of 25, 5 and 1 V.C. existing between a transmitting and a receiving station or area will be provided communication therebetween at a 1 msec, 5 msec and 25 msec effective frame rate and no station or area will require more than a 467 baud buffering means for such traffic demand between any two stations or areas.

It is to be understood that the above-described embodiments are simply illustrative of the principles of the invention. Various other modifications and changes may be made by those skilled in the are which will embody the principles of the invention and fall within the spirit and scope.

I claim:

1. A method of providing efficient access in a communication system between at least one transmitter disposed in a first ground area and a plurality of receiving stations having a plurality of different communication traffic requirements disposed in a second remote ground area, the method comprising the steps of:
   (a) transmitting information destined for the plurality of receiving stations in a transmission burst; and
   (b) in performing step (a), transmitting in each transmission burst a plurality of q subbursts, each subburst comprising digital information associated with a particular receiving station and including preamble information bits and a plurality of information bits where the preamble bits comprise, inter alia, information for accessing the proper receiving station to receive and process the included information bits,
   characterized in that
   the method comprises the further steps of:
   (c) transmitting a plurality of s sequential transmission bursts during a predetermined time interval to form a communication sequence which communication sequence is sequentially repeated, each communication sequence being capable of providing q·s one-way transmission channels between the first and second ground areas; and
   (d) transmitting within n assigned subbursts in each transmission burst of the communication sequence the digital information associated with n·s transmission channels required between the at least one transmitter in the first ground area and a receiving station in the second ground area when n is an integer while transmitting within each of m assigned subbursts spaced at preselected intervals throughout the s transmission bursts of the communication sequence the digital information associated with m transmission channels required between said at least one transmitter in the first ground area and a receiving station in the second group area when m<s.

2. The method according to claim 1 wherein the first ground area includes at least a second transmitter also desiring to communicate with the plurality of receiving stations disposed in the second ground area using the TDM accessing mode
   characterized in that
   the method comprises the further step of:
   (e) in performing step (d), also transmitting within n assigned subbursts in each transmission burst of the communication sequence the digital information associated with n·s transmission channel required between the at least second transmitter and a receiving station in the second ground area when n is an integer, transmitting within each of m assigned subbursts spaced at preselected intervals throughout the s transmission bursts of the communication sequence the digital information associated with m transmission channels required between said at least second transmitter and a receiving station in the second ground area when m<s.

3. The method according to claims 1 or 2
   characterized in that
   the method comprises the further step of:
   (f) in performing step (d) or (e), transmitting within adjacent subbursts in each transmission burst the digital information associated with the transmission channels required between a transmitter in the first ground area and a particular receiving station in the second ground area.

4. The method according to claims 1 or 2
   characterized in that
   the method comprises the further step of:
   (f) in performing step (d) or (e), transmitting within one assigned subburst in every corresponding $x^{th}$ transmission burst the digital information associated with the transmission channels required between said at least one transmitter in the first ground area and the receiving station in the second ground area where the total requirement between said transmitter and said receiver is s/x transmission channels and the value s/x comprises an integer.

5. A method of providing efficient access in a communication system between transmitters disposed in a plurality of first spaced-apart ground areas and a plurality of receiving stations disposed in a second remote ground area and having different communication traffic requirements with each of the transmitters, the method comprising the steps of:
   (a) sequentially transmitting information destined for the plurality of receiving stations in a separate transmission burst from each of the plurality of first ground areas during a switching frame interval using a time-division multiple access mode;
   (b) in performing step (a), transmitting in each transmission burst a plurality of q subbursts, each subburst comprising digital information associated with a particular receiving station and including preamble bits and a plurality of information bits where the preamble bits comprise, inter alia, information for accessing the proper receiving station to receive and process the included information bits;
   characterized in that
   the method comprises the further steps of:
   (c) transmitting a plurality of s sequential switching frames during a predetermined time interval to form a communication sequence which is sequentially repeated, each communication sequence being capable of providing q·s one-way transmission channels between the transmitters in each of the first spaced-apart ground areas and the receiving stations in the second ground area; and (d) transmitting within n assigned subbursts in each corresponding transmission burst of each switching frame interval of the communication sequence the digital information associated with n·s transmission channels required between each transmitter in the particular first ground area associated with said corresponding transmission burst and the receiving stations in the second ground area where n is an integer, while transmitting within each of m assigned subbursts spaced at preselected intervals throughout the s corresponding transmission bursts of the communication sequence the digital information associated with m transmission channels required between the transmitters in the particular first ground area associated with said corresponding transmission bursts and the receiving stations in the second ground area when m<s.

6. The method according to claim 5
characterized in that
the method comprises the further step of:
(e) in performing step (d), transmitting within adjacent subbursts in each corresponding transmission burst the digital information associated with the transmission channels required between a transmitter in the first ground area and a particular receiving station in the second ground area.

7. The method according to claim 5 or 6
characterized in that
the method comprises the further step of:
(f) in performing step (d) or (e), transmitting within one assigned subburst in every corresponding $x^{th}$ transmission burst the digital information associated with s/x transmission channels required between said transmitters in a particular first ground area and the receiving stations in the second group area when the total requirement between said transmitters and receivers is s/x transmission channels and the value s/x comprises an integer.

8. A method of providing efficient access in a satellite communication system between ground transmitter/receiver stations disposed in a plurality of spaced-apart ground areas on the surface of a celestial body, the system comprising a satellite capable of switching transmissions concurrently received from the plurality of ground areas via a plurality of y up-link beams of electromagnetic energy for concurrent retransmission to the destined ground areas via a plurality of y down-link beams of electromagnetic energy using a time-division multiple access mode of communication, the method comprising the steps of:

(a) transmitting in each up-link beam from the ground stations in the associated ground areas a series of y transmission bursts for retransmission by the satellite in the plurality of y down-link beams, respectively, during a switching frame interval using a time-division multiplexed communication mode for accessing the ground stations in the ground areas receiving the plurality of y down-link beams; and (b) in performing step (a), transmitting in each transmission burst of the switching frame interval a plurality of q subbursts, each subburst comprising digital information associated with a particular receiver station and including both preamble bits comprising information, inter alia, for accessing the proper ground station and a plurality of information bits destined for the accessed ground station, characterized in that
the method comprises the further steps of:
(c) transmitting a plurality of s sequential switching frame intervals formed in step (a) during a predetermined time interval to form a communication sequence which communication sequence is sequentially repeated, each communication sequence being capable of providing q·s one-way transmission channels between the ground areas associated with each up-link beam, and the ground areas associated with each down-link beam; and (d) transmitting within n assigned subbursts in each corresponding transmission burst of each switching frame interval of the communication sequence the digital information associated with n·s transmission channels required between each transmitter station and receiver station served by the down-link beam associated with said corresponding transmission burst when n is an integer.

9. The method according to claim 8
characterized in that
the method comprises the further step of:
(e) in performing step (d), transmitting within one assigned subburst in the corresponding transmission burst in every $x^{th}$ switching frame interval of the communication sequence the digital information associated with a separate one of every s/x transmission channels required between the transmitter stations in each ground area served by a particular up-link beam and the receiving stations in a ground area served by a particular down-link beam associated with said corresponding transmission burst when the valve of s/x comprises an integer.

10. The method according to claim 8
characterized in that
the method comprises the further step of:
(e) in performing step (d), transmitting within assigned subbursts spaced at preselected intervals of the remaining subbursts in each corresponding transmission burst the digital information associated with every s/x transmission channels required between each transmitting station served by a particular up-link beam and the receiving station in each ground area served by the down-link beam associated with said corresponding transmission burst when s/x does not comprise an integer.

11. The method according to claims 9 or 10
characterized in that
the method comprises the further step of:
(f) in performing step (e), transmitting within adjacent subbursts in each corresponding transmission bursts the digital information associated with the transmission channels which are assigned to the same ground area receiving stations.

12. The method according to claim 10 wherein one of the plurality of y up-link beams and one of the plurality of y down-link beams is a scanning beam for providing communication via the satellite with transmitter/receiver ground stations in multiple access ones of the plurality of spaced-apart ground areas,
characterized in that
the method comprises the further step of:
(f) in performing step (e), during the communication sequence associated with the up-link scanning beam, transmitting the assigned subbursts in the corresponding transmission burst in groups of sequential subbursts, each group of sequential subbursts comprising n subbursts selectively dedicated to the plurality of n·s transmission channels required between a particular one of the ground areas associated with the up-link scanning beam and the ground areas associated with the down-link beam associated with each plurality of s corresponding transmission bursts of the communication sequence.

13. The method according to claim 12 characterized in that
the method comprises the further step of:
(g) in performing step (f), transmitting within adjacent subbursts in each group of sequential subbursts the digital information related to the transmission channels associated with the same receiver station ground area.

* * * * *